US006778702B1

(12) United States Patent
Sweet

(10) Patent No.: US 6,778,702 B1
(45) Date of Patent: Aug. 17, 2004

(54) METHOD AND APPARATUS FOR ASSESSING THE QUALITY OF SPECTRAL IMAGES

(75) Inventor: James N. Sweet, San Diego, CA (US)

(73) Assignee: BAE Systems Mission Solutions Inc., San Diego, CA (US)

( * ) Notice: Subject to any disclaimer, the term of this patent is extended or adjusted under 35 U.S.C. 154(b) by 546 days.

(21) Appl. No.: 09/695,797

(22) Filed: Oct. 23, 2000

Related U.S. Application Data

(63) Continuation-in-part of application No. 09/664,701, filed on Sep. 19, 2000.

(51) Int. Cl.[7] .................................................. G06K 9/46
(52) U.S. Cl. ........................ 382/191; 382/209; 382/224; 382/197
(58) Field of Search ................................ 382/103, 159, 382/112, 181, 190, 191, 197, 203, 209, 218, 219, 224, 253

(56) References Cited

U.S. PATENT DOCUMENTS

| | | | |
|---|---|---|---|
| 4,912,770 A | 3/1990 | Seto et al. | 382/107 |
| 5,329,595 A | 7/1994 | Davies | 382/103 |
| 5,513,128 A | 4/1996 | Rao | 382/232 |
| 5,832,182 A | 11/1998 | Zhang et al. | 706/50 |
| 6,008,492 A | 12/1999 | Slater et al. | 250/334 |
| 6,075,891 A | 6/2000 | Burman | 382/191 |
| 6,079,665 A | 6/2000 | Nella et al. | 244/3.17 |
| 6,546,146 B1 | 4/2003 | Hollinger et al. | 382/253 |

OTHER PUBLICATIONS

Jafarkhani, et al "Adaptive image coding using spectral classification", Institute for systems research University of Maryland, pp 1–15, 1997.*

Chang, et al "Unsupervised hyperspectral image analysis using independent component analysis", IEEE, pp. 3136–3138, 2000.*

Qian, et al "Vector quntization using spectral index based multiple sub–codebooks for hyperspectral data compression", IEEE, pp. 1183–1190, 2000.*

Halford, Carl E., "Developing Operational Performance Metrics Using Image Comparison Metrics And The Concept Of Degradation Space", Society of Photo–Optical Instrumentation Engineers; Optical Engineering, vol. 38, No. 5, pp. 836–844, (May 1999).

Leachtenauer, Jon C., "General Image–Quality Equation: GIQE", Applied Optics, vol. 36, No. 32 (Nov. 10, 1997).

Nill, Norman B., "Objective Image Quality Measure Derived from Digital Image Power Spectra", Society of Photo–Optical Instrumentation Engineers, Optical Engineering, vol. 31, No. 4, pp. 813–825 (Apr. 1992).

(List continued on next page.)

*Primary Examiner*—Daniel Mariam
(74) *Attorney, Agent, or Firm*—Cooley Godward LLP

(57) ABSTRACT

A method is disclosed herein for evaluating quality of an image. The disclosed method contemplates receiving a spectral image and extracting a plurality of pixels therefrom. The plurality of pixels are converted into a plurality of spectral vectors, wherein each element in each spectral vector represents a property of a respective one of N spectral bands. The plurality of spectral vectors are then categorized into a set of M classes. The method further includes the step of computing a mean vector for each of the M classes based upon the spectral vectors associated therewith. Next, spectral similarity values between pairs of the mean vectors are computed. The distribution of these spectral similarity values may then be analyzed in order to obtain information relevant to image quality.

19 Claims, 19 Drawing Sheets

OTHER PUBLICATIONS

Smith, Steven L., "Understanding Image Quality Losses Due to Smear in High–Resolution Remote Sensing Imaging Systems", Society of Photo–Optical Instrumentation Engineers, Optical Engineering, vol. 38, No. 5, pp. 821–826 (May 1999).

Qlan, S., Hollinger, A.B., Williams, D., and Manak, D., "Fast Three–Dimensional Data Compression of Hyperspectral Imagery Using Vector Quantization with Spectral–Feature–Based Binary Coding," Optical Engineering, Nov. 11, 1996, 3242–3249, vol. 35, No. 11, Society of Photo–Optical Instrumentation Engineers.

Blake, P., Hayashi, J., Lundeen, T.; Sharp, M. and Carinhas, P., "A Phenomenology–Based Approach to the Automated Recognition of Materials in HYDICE Imagery," IEEE International Geoscience and Remote Sensing Symposium, 1998, 1004–1006, IEEE Publications, Piscataway, New Jersey.

Canta, G.R. and Poggi, G., "Kronecker–Product Gain–Shape Vector Quantization for Multispectral and Hyperspectral Image Coding," IEEE Transactions on Image Processing, May 1998, 668–678, vol. 7, No. 5, IEEE Publications, Picataway, New Jersey.

Abousleman, G.P., "Coding of Hyperspectral Imagery Using Adaptive Classification and Trellis–Coded Quantization," Society of Photo–Optical Instrumentation Engineers, 1997, 203–213, vol. 3071.

Blake, P., Hayashi, J., Lundeen, T.; Sharp, M. and Carinhas, P., "A Phenomenology–Based Approach to the Automated Recognition of Materials in HYDICE Imagery," IEEE International Geoscience and Remote Sensing Symposium, 1998, 1004–1006, IEEE Publications, Piscataway, New Jersey.

Canta, G.R. and Poggi, G., "Kronecker–Product Gain–Shape Vector Quantization for Multispectral and Hyperspectral Image Coding," IEEE Transactions on Image Processing, May 1998, 668–678, vol. 7, No. 5, IEEE Publications, Picataway, New Jersey.

Image Resolution Assessment and Reporting Standards (IRARS) Committee, 1995, "Multispectral Imagery Interpretability Rating Scale, Reference Guide," http://www.fas.org/irp/imint/niirs_ms/msiirs.htm#IIRS.

Image Resolution Assessment and Reporting Standards (IRARS) Committee, 1996a, "Civil NIIRS Reference Guide, Appendix III, History of NIIRS," http://www.fas.org/irp/imint/niirs_c/.

Image Resolution Assessment and Reporting Standards (IRARS) Committee, 1996b, Civil NIIRS Reference Guide, http://www.fas.org/irp/imint/niirs_c/guide.htm.

Memon, N.D., "A Bounded Distortion Compression Scheme for Hyperspectral Image Data," International Geoscience and Remote Sensing Symposium, Apr. 1996, 1039–1041, IEEE Publications, Picataway, New Jersey.

Qlan, S., Hollinger, A.B., Williams, D., and Manak, D., "Fast Three–Dimensional Data Compression of Hyperspectral Imagery Using Vector Quantization with Spectral–Feature–Based Binary Coding," Optical Engineering, Nov. 11, 1996, 3242–3249, vol. 35, No. 11, Society of Photo–Optical Instrumentation Engineers.

Reitz, J..P, Brower, B.V., and Lan, A., "Hyperspectral Compression Using Spectral Signature Matching With Error Encoding," Society of Photo–Optical Instrumentation Engineers, Jun. 1996, 64–73, vol. 2821.

Roger, R.E. and.Arnold, J.R., Reliably Estimating the Noise In AVIRIS Hyperspectral Images, Int. J. Remote Sensing, 1996, 1951–1962, vol. 17, No. 10, Taylor & Francis Ltd.

* cited by examiner

| LB. N / ac. | SSV on 24 May 1998 | | | | | LB. N / ac. | SSV on 16 Aug. 1998 | | | |
|---|---|---|---|---|---|---|---|---|---|---|
| | 240 | 120 | 80 | 40 | 0 | | 240 | 120 | 80 | 40 | 0 |
| 240 | 0 | | | | | 240 | 0 | | | | |
| 120 | 0.0219 | 0 | | | | 120 | 0.0031 | 0 | | | |
| 80 | 0.0138 | 0.007 | 0 | | | 80 | 0.0043 | 0.004 | 0 | | |
| 40 | 0.0159 | 0.013 | 0.009 | 0 | | 40 | 0.0143 | 0.012 | 0.011 | 0 | |
| 0 | 0.024 | 0.031 | 0.026 | 0.018 | 0 | 0 | 0.035 | 0.031 | 0.033 | 0.022 | 0 |

| LB. N / ac. | SSV on 31 May 1998 | | | | | LB. N / ac. | SSV on 30 Aug. 1998 | | | |
|---|---|---|---|---|---|---|---|---|---|---|
| | 240 | 120 | 80 | 40 | 0 | | 240 | 120 | 80 | 40 | 0 |
| 240 | 0 | | | | | 240 | 0 | | | | |
| 120 | 0.0122 | 0 | | | | 120 | 0.0045 | 0 | | | |
| 80 | 0.0126 | 0.004 | 0 | | | 80 | 0.0091 | 0.005 | 0 | | |
| 40 | 0.0081 | 0.008 | 0.006 | 0 | | 40 | 0.0233 | 0.018 | 0.013 | 0 | |
| 0 | 0.014 | 0.018 | 0.015 | 0.010 | 0 | 0 | 0.039 | 0.033 | 0.030 | 0.019 | 0 |

| LB. N / ac. | SSV on 12 July 1998 | | | | | LB. N / ac. | SSV on 6 Sept. 1998 | | | |
|---|---|---|---|---|---|---|---|---|---|---|
| | 240 | 120 | 80 | 40 | 0 | | 240 | 120 | 80 | 40 | 0 |
| 240 | 0 | | | | | 240 | 0 | | | | |
| 120 | 0.0218 | 0 | | | | 120 | 0.0088 | 0 | | | |
| 80 | 0.0260 | 0.023 | 0 | | | 80 | 0.0181 | 0.018 | 0 | | |
| 40 | 0.0278 | 0.042 | 0.023 | 0 | | 40 | 0.0252 | 0.017 | 0.017 | 0 | |
| 0 | 0.087 | 0.098 | 0.080 | 0.050 | 0 | 0 | 0.041 | 0.034 | 0.020 | 0.020 | 0 |

| LB. N / ac. | SSV on 19 July 1998 | | | | | LB. N / ac. | SSV on 4 Oct. 1998 | | | |
|---|---|---|---|---|---|---|---|---|---|---|
| | 240 | 120 | 80 | 40 | 0 | | 240 | 120 | 80 | 40 | 0 |
| 240 | 0 | | | | | 240 | 0 | | | | |
| 120 | 0.0068 | 0 | | | | 120 | 0.0144 | 0 | | | |
| 80 | 0.0154 | 0.010 | 0 | | | 80 | 0.0107 | 0.009 | 0.005 | 0 | |
| 40 | 0.0155 | 0.012 | 0.009 | 0 | | 40 | 0.0118 | 0.005 | * | * | |
| 0 | 0.058 | 0.056 | 0.047 | 0.040 | 0 | 0 | * | * | * | * | 0 |

Fig. 6

METHOD AND APPARATUS FOR ASSESSING THE QUALITY OF SPECTRAL IMAGES

CROSS-REFERENCE TO RELATED APPLICATIONS

This application is a continuation-in-part of U.S. patent application Ser. No. 09/664,701, filed Sep. 19, 2000, and entitled, "METHOD AND APPARATUS FOR DETERMINING SPECTRAL SIMILARITY" and which is incorporated herein in its entirety including any drawings.

FIELD OF THE INVENTION

The present invention relates to the field of image processing, and more particularly to a method and system for assessing the quality of spectral images.

BACKGROUND OF THE INVENTION

It has recently become possible to commercially obtain satellite and aerial images of terrain of interest from a number of sources. For example, certain large farms currently use satellite images provided by Landsat, the system of land-observing satellites operated by the federal government. Landsat satellites orbit the earth at approximately 900 km., and provide images in which each pixel represents a square area of between $1 \text{ m}^2$ and $1\text{E}6 \text{ m}^2$ (a pixel area of 100 $\text{m}^2$ is common for systems designed for land-use purposes). Visible, near-infrared, shortwave infrared, thermal infrared sensors deployed on such satellites can detect, among other things, the spectral reflectance, temperature, and other physical characteristics of specified terrestrial areas. In one application, these images are overlaid onto farm mapping programs to show areas of plant stress or potential yield.

The sensors used in generating the images used for many commercial purposes are typically characterized as either "multispectral" or "hyperspectral". Multispectral sensors collect images of a terrain or landscape and provide a handful of wide spectral bands of imagery. These bands encompass the visible, short wave infrared, and, in some cases, thermal infrared portion of the electromagnetic spectrum. Similarly, hyperspectral sensors typically provide hundreds of narrow spectral bands of spatial imagery spanning the visible, near-infrared, and shortwave infrared portion of the electromagnetic spectrum. As a result, images obtained using hyperspectral sensors generally afford greater spectral discrimination than those obtained using multispectral sensors.

Despite the existence of myriad techniques for processing image data collected from multispectral and hyperspectral sensors, there is not known to exist an objective standard for determining the quality of an image based upon its spectral characteristics. Conventionally, image quality is inferred based upon measurements of a number of parameters including, for example, spatial resolution, calibration accuracy, spectral resolution, signal to noise, contrast, bit error rate, dynamic range, sensor stability, and geometric registration. A manual and subjective image quality evaluation is known as the Multispectral Imagery Interpretability Rating Scale ("MS IIRS"). However, the MS IIRS is currently continuing to be refined, and is not widely used. Attempts have also been made to derive mathematical constructs indicative of image quality. One such construct, known as The General Image Quality Equation ("GIQE"), is used in parametric evaluation of single band images. See, e.g., Leachtenauer, J. C., Malila, W., Irvine J., Colburn, L., and Salvaggio, N., Nov. 10, 1997, *General Image-Quality Equation*, Applied Optics, Vol. 36, No. 32. The GIQE may also be used to produce an image quality value applicable to the National Interpretability Rating Scale ("NIIRS"). However, the MS IIRS, GIQE and NIIRS are not known to be useful in objectively assessing the quality of multispectral or hyperspectral images.

SUMMARY OF THE INVENTION

In summary, the present invention pertains to a method for evaluating quality of an image. The inventive method contemplates receiving a spectral image and extracting a plurality of pixels therefrom. The plurality of pixels are converted into a plurality of spectral vectors, wherein each element in each spectral vector represents a property of a respective one of N spectral bands. The plurality of spectral vectors are then categorized into a set of M classes. The inventive method further includes the step of computing a mean vector for each of the M classes based upon the spectral vectors associated therewith. Next, spectral similarity values between pairs of the mean vectors are computed. The distribution of these spectral similarity values may then be analyzed in order to obtain information relevant to image quality.

In another aspect, the present invention relates to a method for evaluating quality of a received spectral image. The pixels from the spectral image are first organized into a plurality of classes. A mean spectral vector is then computed for each of the plurality of classes. The inventive method further includes the step of computing spectral similarities between pairs of the mean spectral vectors. These spectral similarities are then analyzed in order to obtain information relevant to quality of the received spectral image.

The present invention also pertains to an image processing system having an input interface through which is received a spectral image. The image processing system further includes a storage medium having stored therein an image quality assessment stored program. A processor is operative to execute the image quality assessment stored program and thereby: (i) organize pixels from the spectral image into a plurality of classes, (ii) determine a mean spectral vector for each of said plurality of classes, (iii) compute spectral similarities between pairs of said mean spectral vectors, and (iv) analyze said spectral similarities in order to obtain information relevant to quality of the image.

In another aspect, the present invention relates to an image processing system having an a input interface through which is received a spectral image. The image processing system further includes a storage medium having stored therein an image quality assessment stored program. A processor is operative to execute the image quality assessment stored program and thereby: (i) extract a plurality of input pixels from the spectral image, (ii) convert the plurality of input pixels into a plurality of spectral vectors, each element in each of the spectral vectors representing a reflectance of a respective one of a plurality of spectral bands, (iii) organize said plurality of spectral vectors into a set of M classes, (iv) determine a mean reflectance vector associated with each of the M classes, (v) compute spectral similarities between pairs of these mean reflectance vectors, and (iv) analyze these spectral similarities in order to obtain information relevant to quality of the received spectral image.

BRIEF DESCRIPTION OF THE DRAWINGS

In the accompanying drawings:

FIG. 6 provides a tabular listing of an exemplary set of minimum Spectral Similarity Values required to discriminate between portions of a field of corn receiving differing amounts of a nitrogen fertilizer application.

DETAILED DESCRIPTION OF THE INVENTION

System Overview

Figure 1:
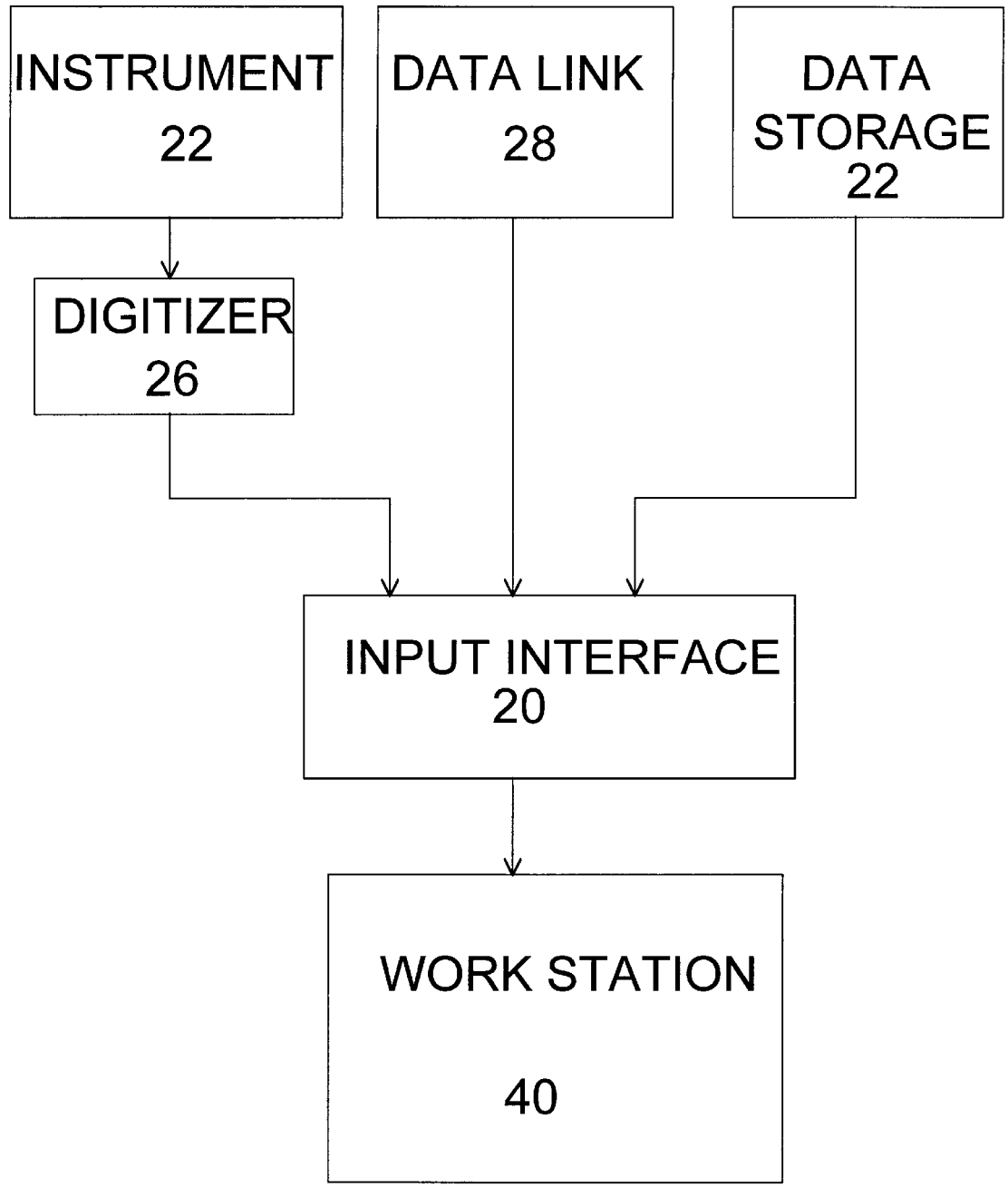
FIG. 1 illustratively represents an exemplary imaging system for producing spectral images disposed to be characterized in accordance with the teachings of the present invention.

FIG. 1 illustratively represents an exemplary imaging system for producing spectral images disposed to undergo quality assessment in accordance with the teachings of the present invention. As is described herein, the teachings of the present invention may be utilized to quantitatively characterize the quality of images obtained using data collected by various instruments and systems. In the system of FIG. 1, data from any of a variety of sources may be received through an input interface 20. Typical data sources include (i) an instrument 22 that provides an analog output signal converted to digital data in a digitizer 26 before being provided to the input interface 20, (ii) a data transmission link 28 that provides digital data directly to the interface 20, and (iii) recorded data storage equipment 32, such as readers for magnetic disks, CD-ROMs, magnetic tape, etc.

The instrument 22 may be realized using any of various types of instrument systems which provide signals indicative of spectral reflectance, such as multi-band digital imaging cameras, color television cameras, multi-band infrared scanners, visible light microscopes, spectroradiometers and the like. Although in the preferred embodiment of FIG. 1 the instrument 22 is disposed to measure spectral reflectance, in alternate implementations other spectral characteristics (e.g. spectral emission) may be measured and processed in accordance with the present invention. Signals are provided by the instrument(s) 22 to the digitizer 26, which produces a set of image pixels defining the optical characteristics of the object or terrain of interest. The data in a single image pixel provided by the digitizer 26, data link 28, or data storage 32 consists of a number of data samples (typically between 10 and 200) which collectively form a spectral "signature" of the image pixel. Each data sample corresponds to the reflectance or ratio of emission of photons from the object as compared to the photons illuminating the surface or terrain of interest at some spectral wavelength.

As is indicated by FIG. 1, a set of image pixels (i.e., an "image set") from the digitizer 26, data link 28 or data storage 32 is provided to the input interface 20. The data received through the input interface 20 is provided to a workstation 40, a computer system capable of appropriate processing, such as image processing. An example of a computer system which may be utilized for characterization of images in accordance with the invention is an HP 9000/720 workstation running under the HP-UNIX operating system, or alternatively a SPARC 20 workstation from Sun Microsystems, Inc. As recognized by those skilled in the art, the workstation 40 includes standard off-the-shelf computing components. Because these computing components, such as a central processing unit, memory storage components, and peripheral devices are generally known to those skilled in the art they will not be explained in greater detail. In the alternative, discrete logic devices and specially designed integrated circuits and commercially available processors can also be used to implement the systems and methods consistent with this invention.

Each spectral signature is converted by the workstation 40 into an N-element spectral vector, where N is the number of bands of interest in the received image set. The elements of each spectral vector correspond to the intensity of a pixel for each spectral band in the image set. This step of the present invention may be effected using conventional image processing software such as, for example, the ENVI program available from Research Systems Inc., of Boulder, Colo. The similarity of various pairs of these N-element spectral vectors may then be characterized with reference to the inventive Spectral Similarity Scale. A quality of the image represented by the received image set may then be ascertained by evaluating the similarity among such pairs of N-element spectral vectors in the manner described herein.

Spectral Similarity Scale

The Spectral Similarity Scale may be used to provide an indication of the similarity between the spectral vectors associated with a given pair of image pixels or other sources of spectral data. In contrast to conventional techniques, such similarity is defined as a function of both the difference in shape between such vectors and the difference in magnitude therebetween. The dependence of the Spectral Similarity Scale upon both correlation and normalized Euclidean Distance accounts for both "shape" and "magnitude" differences between the vectors under consideration. As is described further below, an indication of image quality and other useful information can be determined by making comparisons among the spectral vectors associated with many different pairs of pixels from an image or other sources of spectral data using the Spectral Similarity Scale.

Consistent with one aspect of the invention, a Spectral Similarity Value ("SSV") is computed in accordance with the following expression:

$$\text{Spectral Similarity Value} = \sqrt{d_e^2 + \hat{r}^2} \qquad \text{(Equation 1)}$$

where the Euclidean distance ($d_e$) and normalized correlation coefficient ($\hat{r}$) are defined below. An SSV represents the similarity between a pair of spectral vectors in terms of the Spectral Similarity Scale. In a preferred implementation, the Spectral Similarity Scale has a minimum of zero and a maximum of the square root of two. In this implementation, a small SSV is indicative of a pair of similar spectral vectors.

Normalized Euclidean Distance

As mentioned above, computation of an SSV contemplates representing a difference in magnitude between a pair of spectral vectors by determining a normalized Euclidean Distance between such vectors. The normalized Euclidean Distance ($d_e$) between the spectral vectors X and Y is determined as follows:

$$d_e = \sqrt{\frac{1}{Nb}\sum_{i=1}^{Nb}(x_i - y_i)^2} \quad \text{(Equation 2)}$$

In Equation 2, Nb is the number of spectral bands encompassed by the vectors X and Y, $x_i$ is the value of the vector X in the $i^{th}$ spectral band, and $y_i$ is the value of the vector Y in the $i^{th}$ spectral band. The inclusion of the factor 1/Nb within renders the Euclidean Distance independent of the number of spectral bands (Nb). Accordingly, the normalized Euclidean Distance is representative of the normalized average distance between a pair of spectral vectors and ranges in value between zero and one.

Normalized Correlation Coefficient

The normalized correlation coefficient ($\hat{r}$) is given as:

$$\hat{r} = 1 - r^2 \quad \text{(Equation 3)}$$

where $r^2$ is computed as follows:

$$r^2 = \left(\frac{\frac{1}{Nb-1}\sum_{i=1}^{Nb}(x_i - \mu_x)(y_i - \mu_y)}{\sigma_x \sigma_y}\right)^2 \quad \text{(Equation 4)}$$

In Equation 4, $\mu_x$ denotes the mean value of vector X, $\sigma_x$ denotes the standard deviation of the vector X, $\mu_y$ denotes the mean value of vector Y, and $\sigma_y$ denotes the standard deviation of the vector Y. Equation 4 has been formulated such that the value of the metric $r^2$ ranges between zero and one. The metric $r^2$ provides an indication of the similarity between the shapes of the vectors X and Y, since subtraction of the means $\mu_x$ and $\mu_y$ removes dependence upon bias terms and dividing by the standard deviations $\sigma_x$ and $\sigma_y$ removes dependence upon gain factors. The mean and standard deviation of vector X are computed using Equation 5 and Equation 6, respectively:

$$\overline{\mu_x} = \frac{\sum_{i=1}^{Nb} X_i}{Nb} \quad \text{(Equation 5)}$$

$$\sigma_x = \sqrt{\frac{Nb\sum_{i=1}^{Nb} X_i^2 - \left(\sum_{i=1}^{Nb} X_i\right)^2}{Nb(Nb-1)}} \quad \text{(Equation 6)}$$

The mean and standard deviation of vector Y may be computed by substituting $Y_i$ for $X_i$ in Equation 5 and in Equation 6, respectively.

Figure 2A:
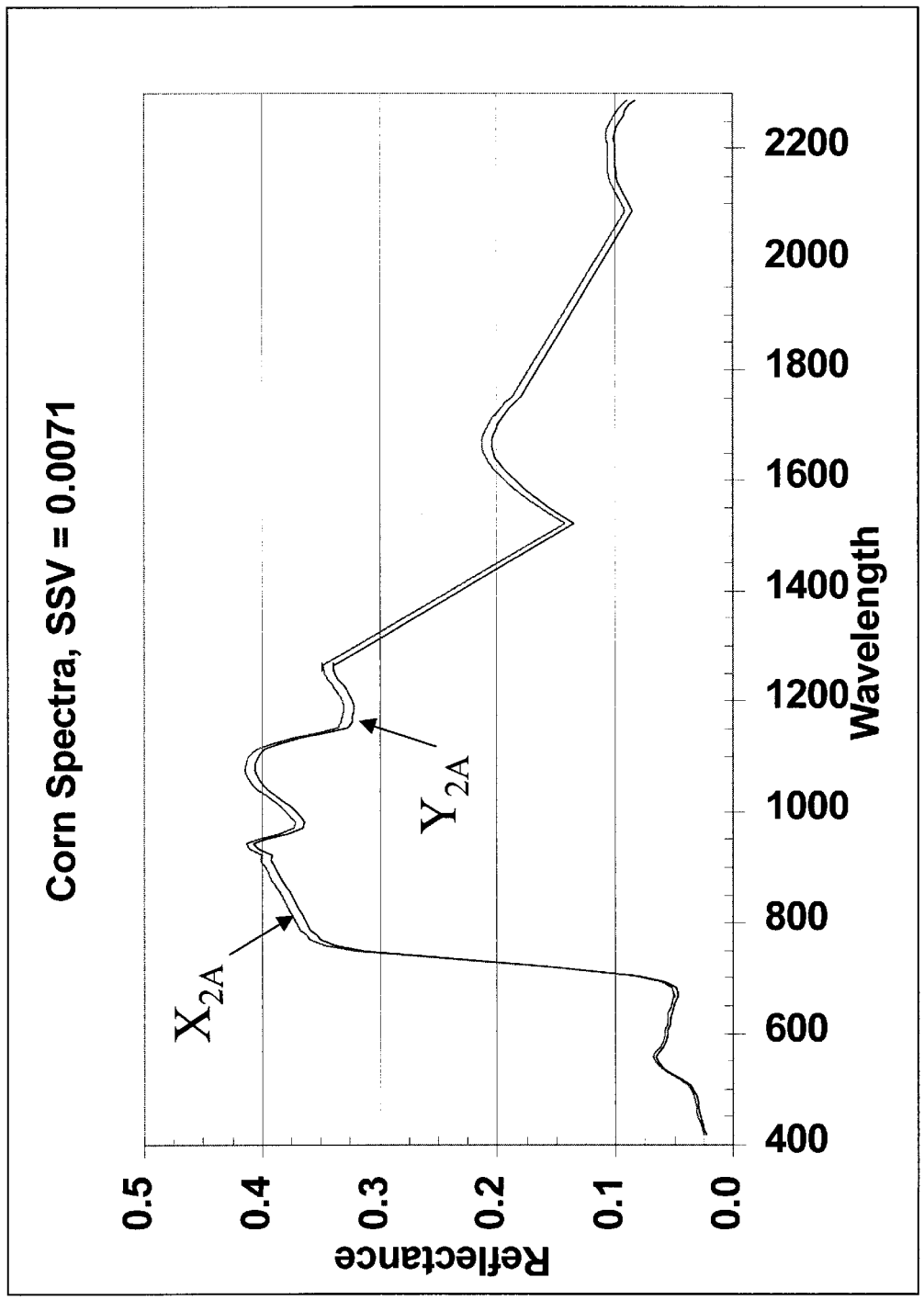
FIGS. 2A–2C and 3A–3D provide graphical representations of exemplary pairs of spectral vectors with respect to which Spectral Similarity Values may be computed.
Figure 2B:
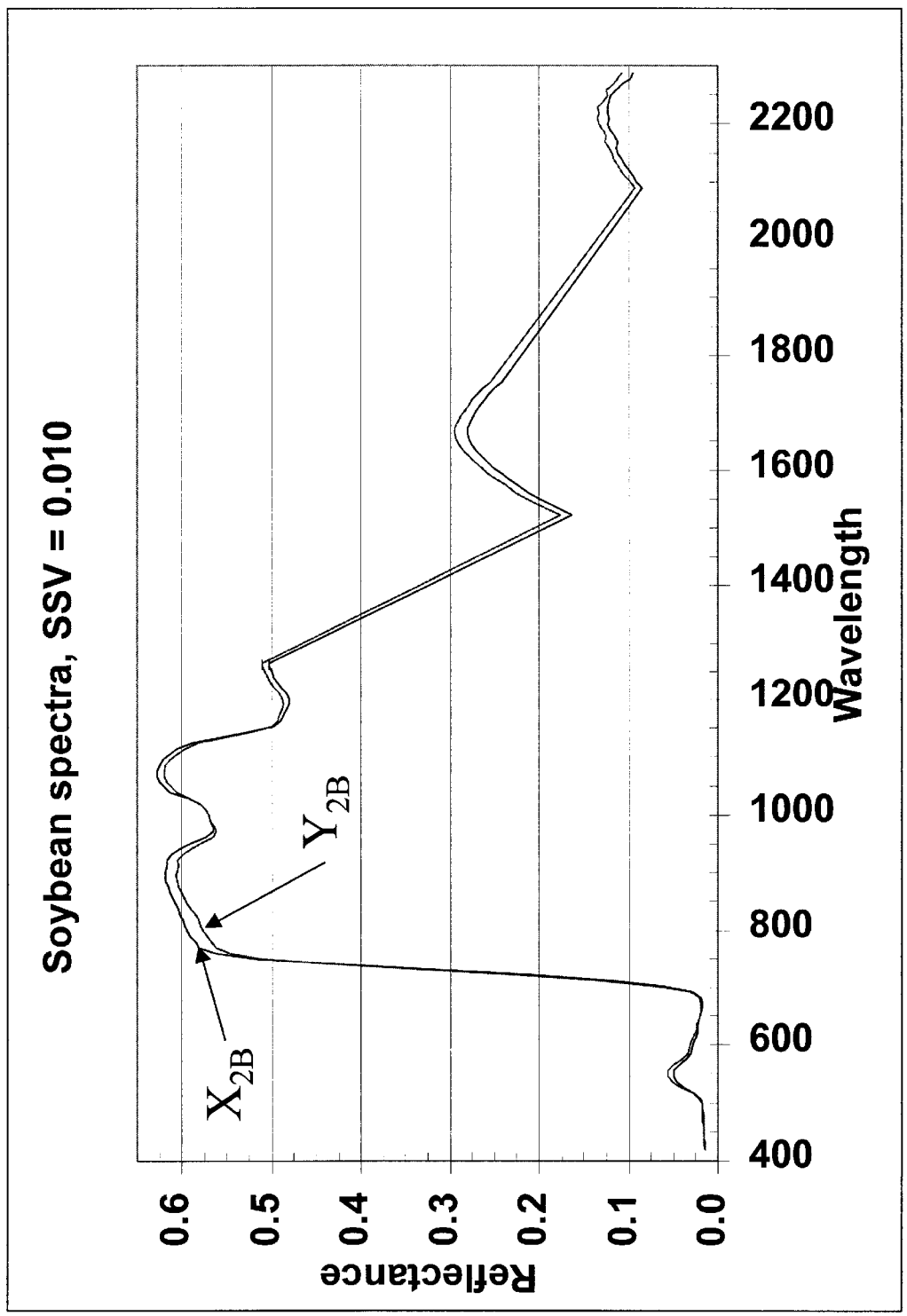
Figure 2C:
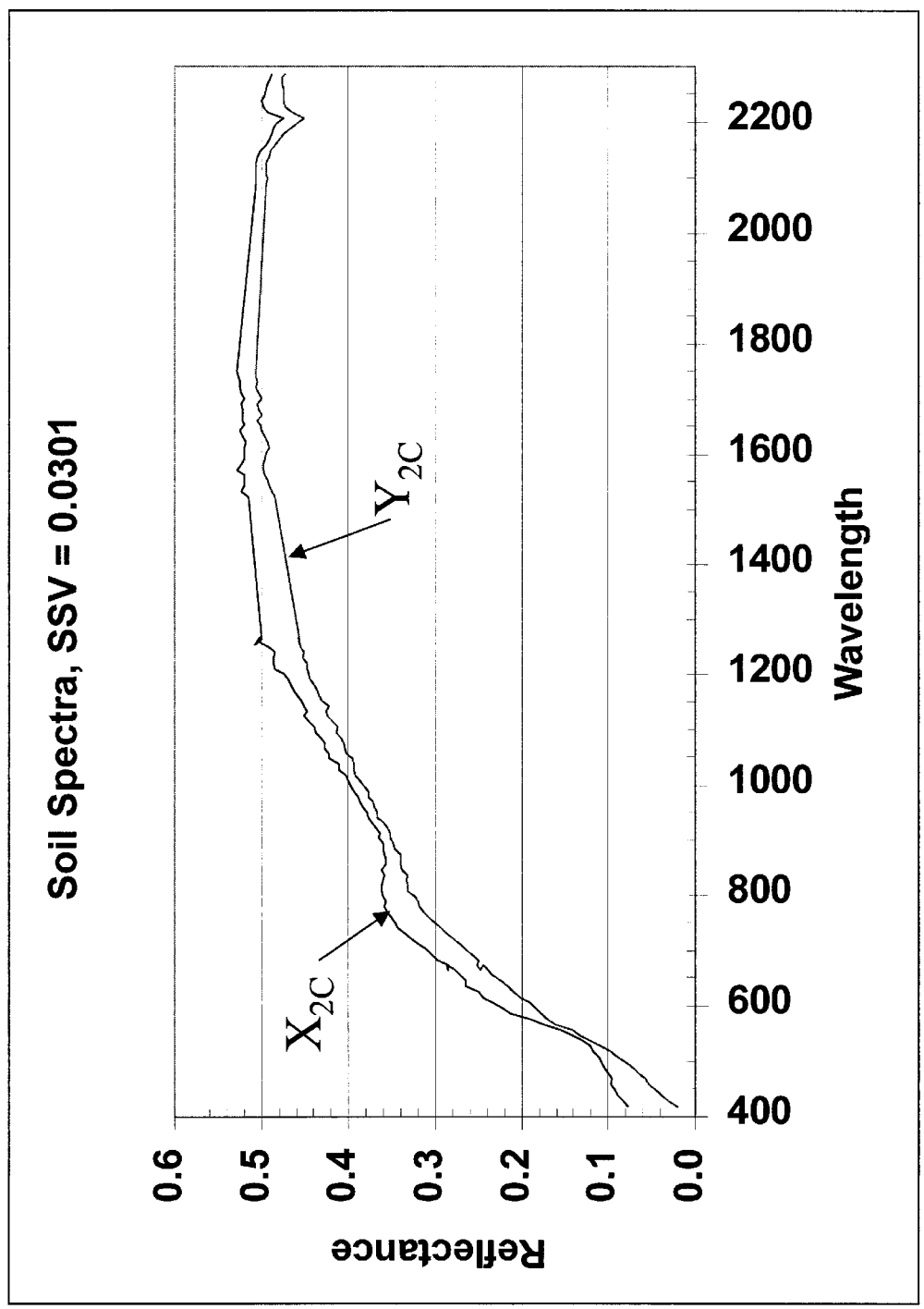

FIGS. 2 and 3 provide graphical representations of exemplary pairs of spectral vectors with respect to which SSVs may be computed in accordance with the present invention. Referring to FIG. 2A, a graphical illustration is provided of spectral vectors $X_{2A}$ and $Y_{2A}$ obtained from a pair of pixels within a received image set representative of some quantity of corn. Evaluation of Equations 1 through 6 using the spectral vectors $X_{2A}$ and $Y_{2A}$ yields an SSV of 0.0071. Similarly, FIG. 2B provides a graphical illustration of a pair of spectral vectors $X_{2B}$ and $Y_{2B}$ derived from a corresponding pair of pixels in an image set representative of a soybean. In the example of FIG. 2B, evaluation of Equations 1 through 6 using the spectral vectors $X_{2B}$ and $Y_{2B}$ results in an SSV of 0.010. In FIG. 2C, a pair of spectral vectors $X_{2B}$ and $Y_{2B}$ derived from a corresponding pair of pixels in an image set representative of soil are graphically depicted. In the case of FIG. 2C, evaluation of Equations 1 through 6 using the spectral vectors $X_{2C}$ and $Y_{2C}$ yields an SSV of 0.0301.

Figure 3A:
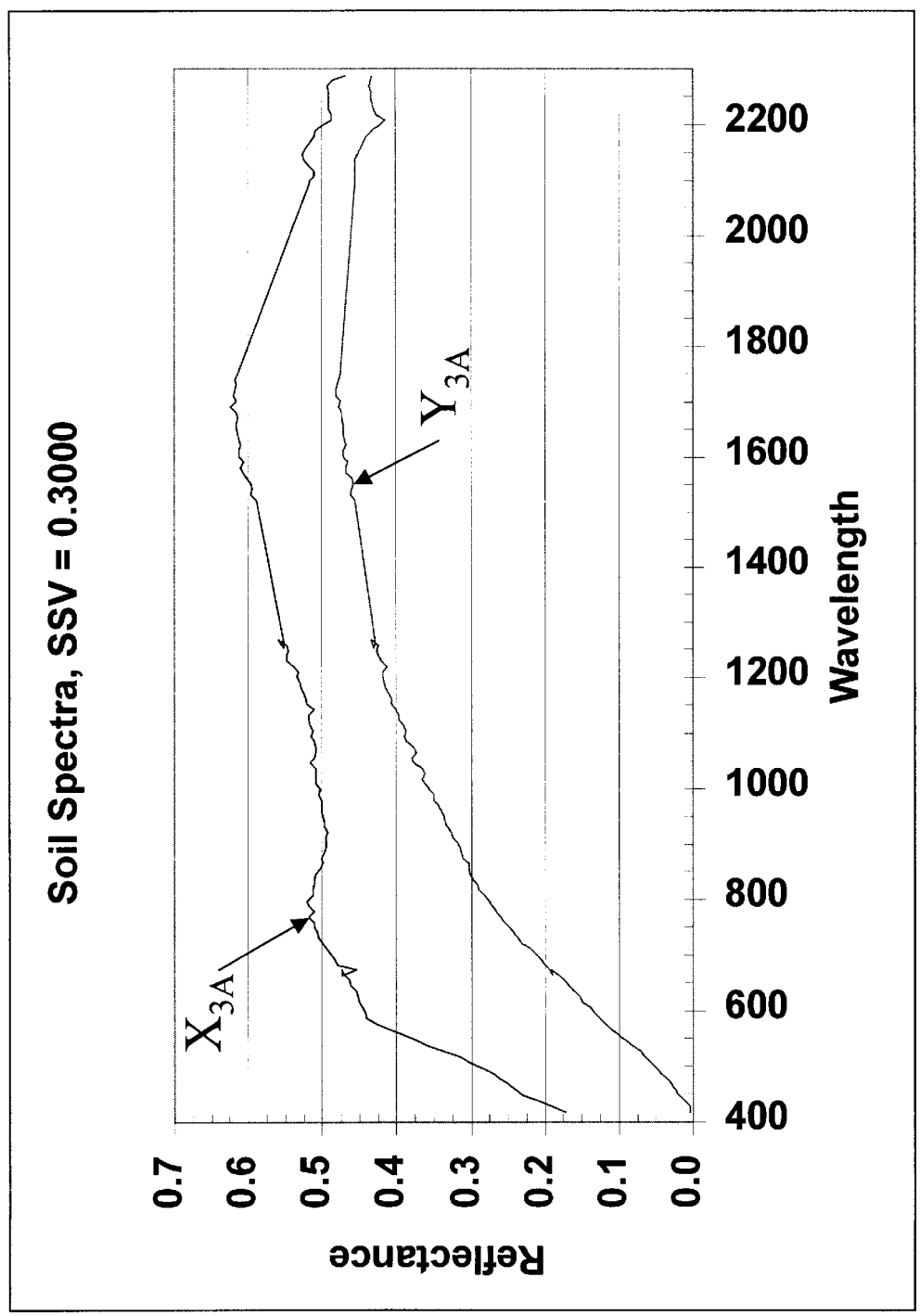
Figure 3B:
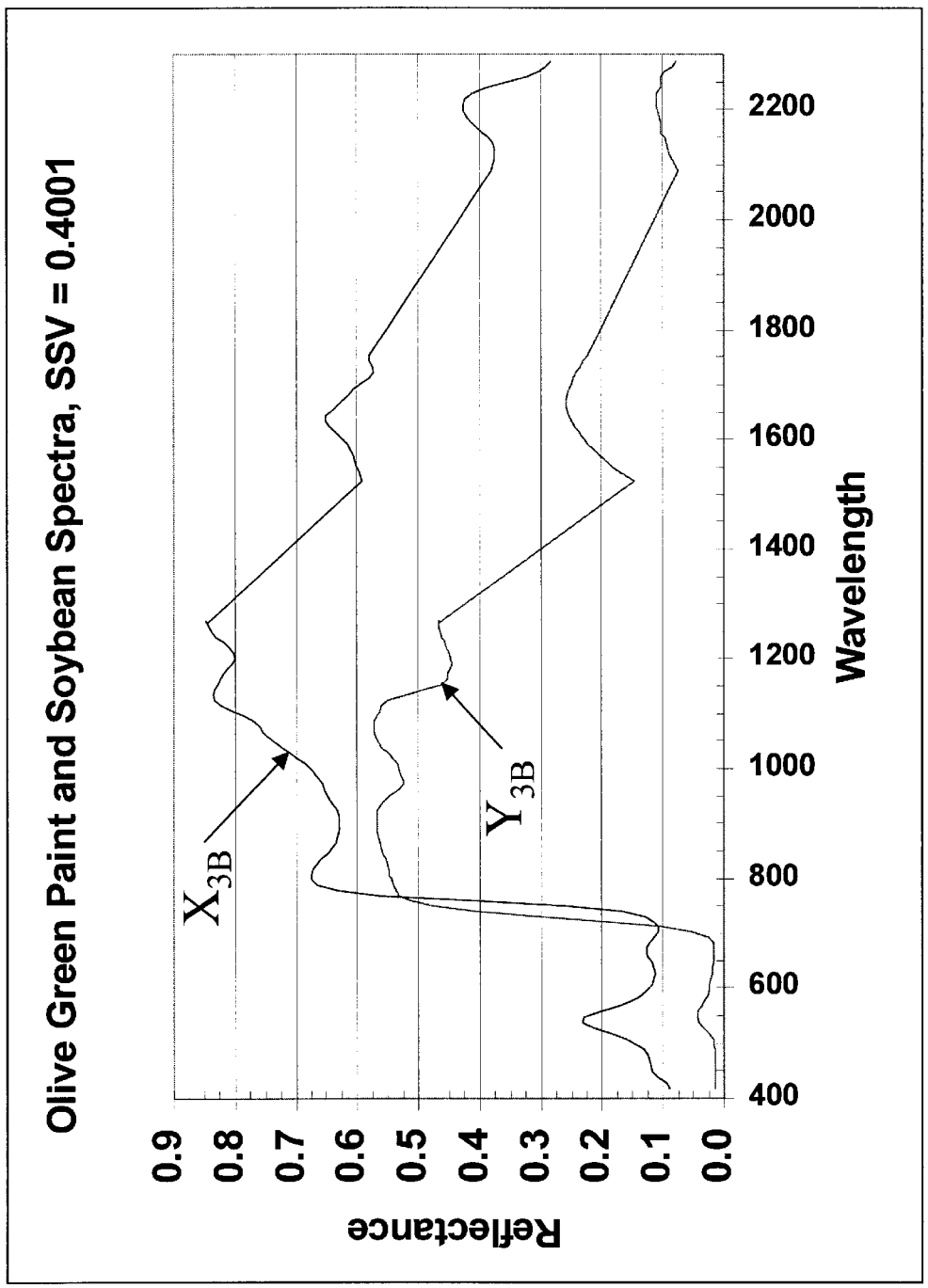
Figure 3C:
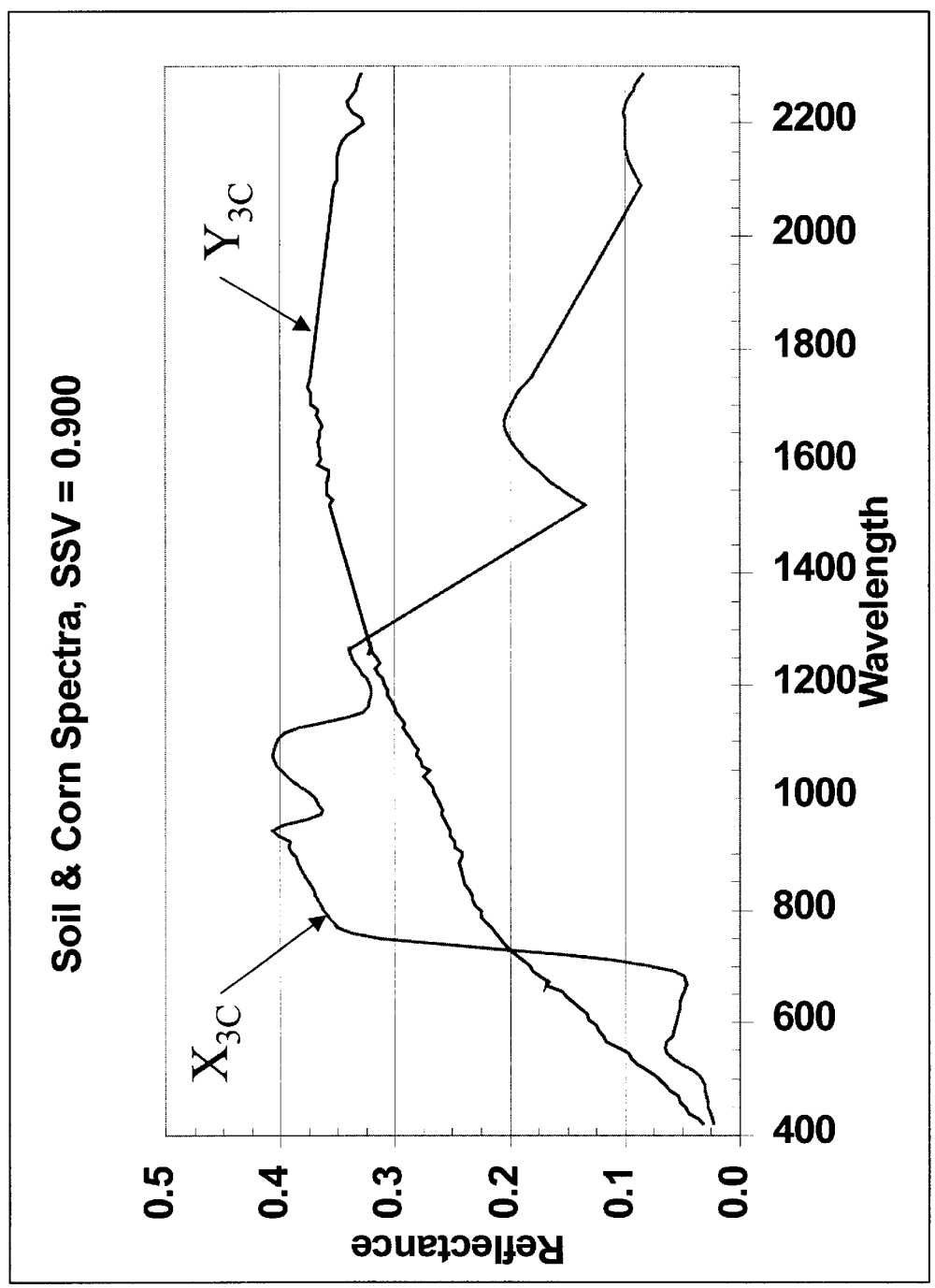

FIGS. 3A–3D provide graphical representations of somewhat more dissimilar pairs of spectral vectors than those depicted in FIGS. 2A–2C. For example, the spectral vectors $X_{3A}$ and $Y_{3A}$ in FIG. 3A are characterized by an SSV of 0.3000. Similarly, the spectral vectors $X_{3B}$ and $Y_{3B}$ of FIG. 3A yield an SSV of 0.4001, the spectral vectors $X_{3C}$ and $Y_{3C}$ in FIG. 3C are characterized by an SSV of 0.900, and the spectral vectors $X_{3D}$ and $Y_{3D}$ in FIG. 3D yield an SSV of 1.3224.

Figure 3D:
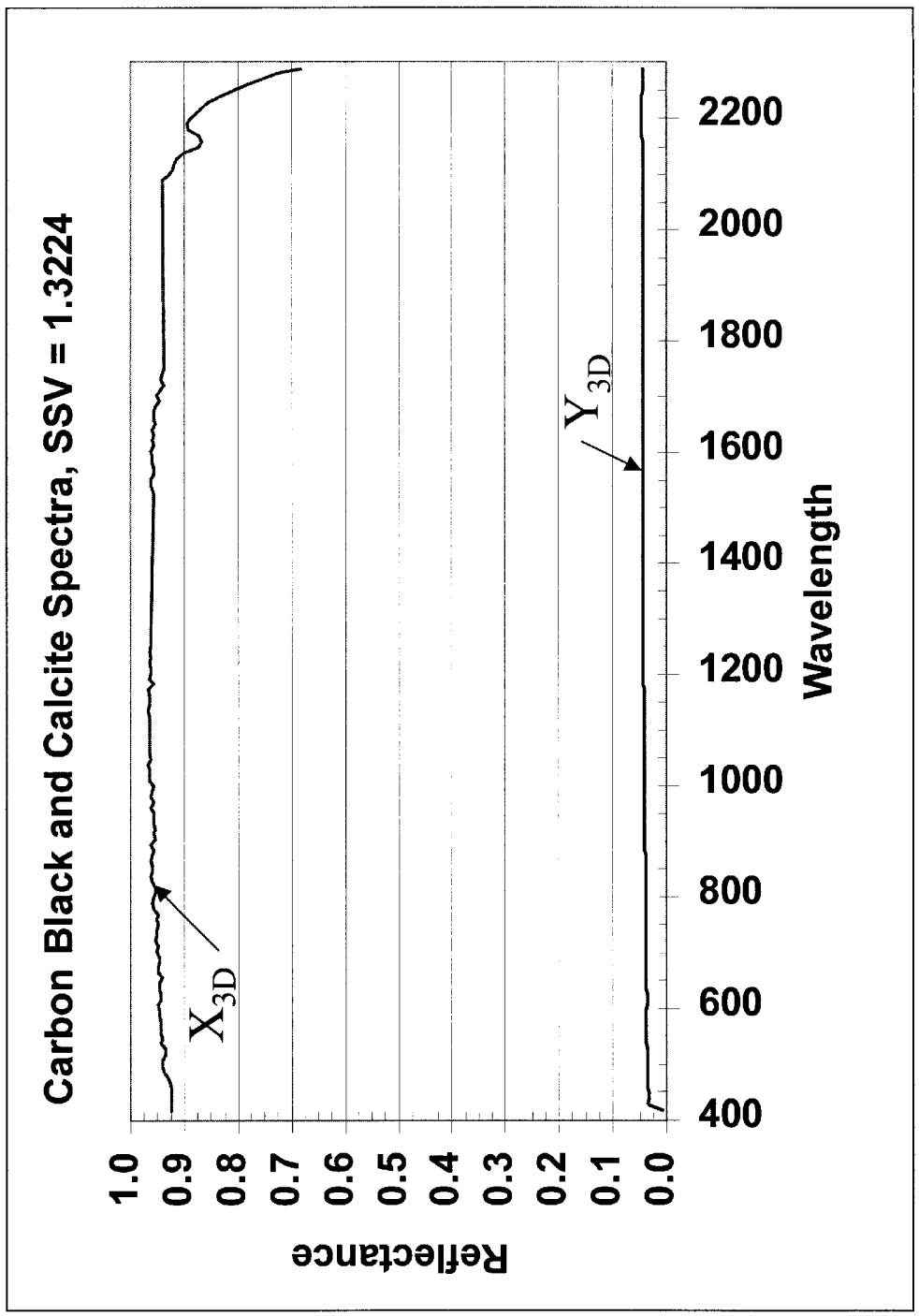

FIGS. 3C and 3D are representative of cases in which the Spectral Similarity offers advantages relative to other potential analysis techniques. For example, notwithstanding the significant "shape" differences between vectors $X_{3C}$ and $Y_{3C}$, the Euclidean distance separating these vectors is relatively small. Accordingly, characterization of the similarity between vectors $X_{3C}$ and $Y_{3C}$ solely based on Euclidean distance could be misleading in view of their substantially different shapes. The converse situation is presented by FIG. 3D; namely, vectors $X_{3D}$ and $Y_{3D}$ are very similar in shape but separated by a large Euclidean distance. It follows that characterization of the vectors $X_{3D}$ and $Y_{3D}$ exclusively based on their similarity in shape also would not be desirable, since this would fail to take into account the substantial reflectance offset between the two vectors. In contrast, the SSV characterizing the vectors $X_{3C}$ and $Y_{3C}$ inherently factors in their substantial difference in shape, while the SSV for the vectors $X_{3d}$ and $Y_{3d}$ takes into account their substantial difference in magnitude.

Image Quality Assessment

Figure 4A:
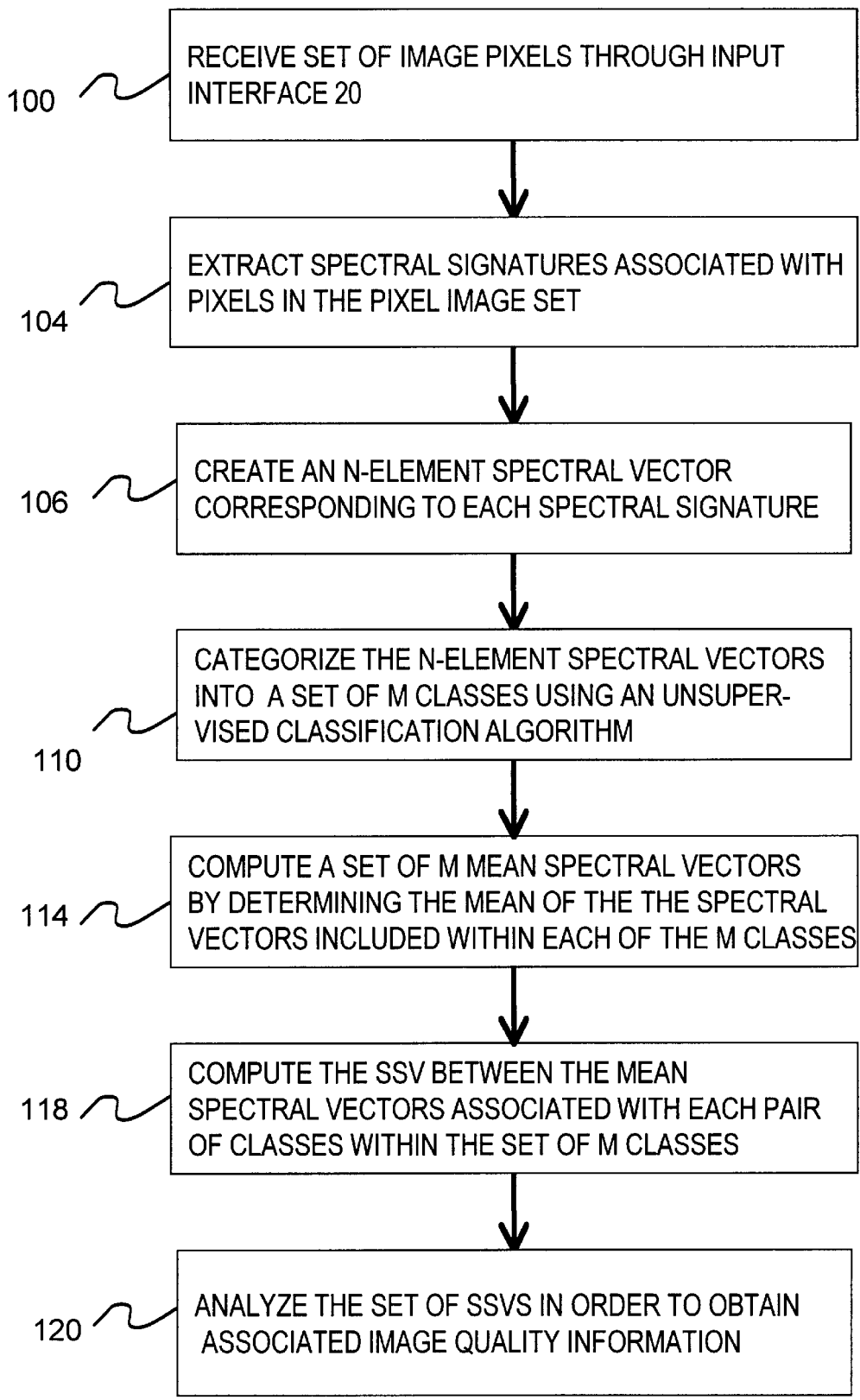
FIG. 4A is a flow chart of a sequence of steps performed in processing a set of image pixels in order to determine quality of the associated image in a manner consistent with the present invention.

FIG. 4A is a flow chart of a sequence of steps performed by workstation 40 in processing a set of image pixels in order to determine quality of the associated image in a manner consistent with the present invention. First, the set of image pixels is received through the input interface 20 (step 100). Next, spectral signatures associated with the pixels included within the set of image pixels are extracted (step 104). Each of these spectral signatures is then converted into an N-element spectral vector (step 106). The N elements of each spectral vector correspond to the intensity of a pixel for each spectral band in the image set.

Once a collection of N-element spectral vectors corresponding to an image has been created as described above, the vectors are categorized into a set of M classes using an unsupervised classification algorithm (step 110). Unsupervised classification is appropriate in the present context as assessments of image quality made in accordance with the present invention have been found to be relatively independent of the precise collection of spectral vectors assigned to particular classes. In an exemplary embodiment, unsupervised classification may be performed using a known classification routine such as, for example, the ISODATA program included within several commercially available image processing products (e.g., RSI/ENVI and ERDAS/IMAGINE). The following exemplary values could be specified for the operating parameters of the ISODATA program: (i) a maximum of 50 classes, (ii) 5% threshold change, (iii) minimum of 100 pixels/class, and (iv) maximum of 3 iterations. Alternatively, an unsupervised classification procedure predicated upon computation of Spectral Similarity Values may be utilized. An exemplary implementation of this classification procedure is described below with reference to FIG. 4B.

Following completion of the unsupervised classification process, a set of M mean spectral vectors is computed by determining the mean (e.g., the mean reflectance as a function of wavelength) of the spectral vectors comprising each of the M classes (step 114). The SSV between the mean spectral vectors associated with each pair of classes within the set of M classes is then determined using Equations 1 through 6 (step 118). For example, there exist 325 possible class pair combinations for a set of 26 classes (M=26), and thus in such case a set of 325 SSVs would be computed in step 118. Although the foregoing describes utilization of an unsupervised classification algorithm in the context of a preferred embodiment of the present invention, it should be understood that the performance of a supervised classification using the SSVs of constituent spectral vectors is also within the scope of the present invention.

In accordance with one aspect of the invention, the set of SSVs computed in step 118 may be analyzed in order to obtain information relevant to the quality of the associated image (step 120). In a preferred embodiment, the both the distribution and minimum of such SSVs are utilized to provide an indication of image quality. In general, it has been found that the smaller the minimum SSV associated with an image, the higher the quality of the image. Similarly, images represented by a large number of class-pairs with relatively small SSVs have been found to be of higher quality than images represented by a large number of class pairs with relatively large SSVs. Other aspects of image quality can be inferred from further analysis of the distribution of SSVs. For example, image diversity is indicated by the number of class-pairs that have relatively large SSVs and image complexity is indicated by the ratio of the number of classes found in the image divided by the area of the image.

Figure 4B:
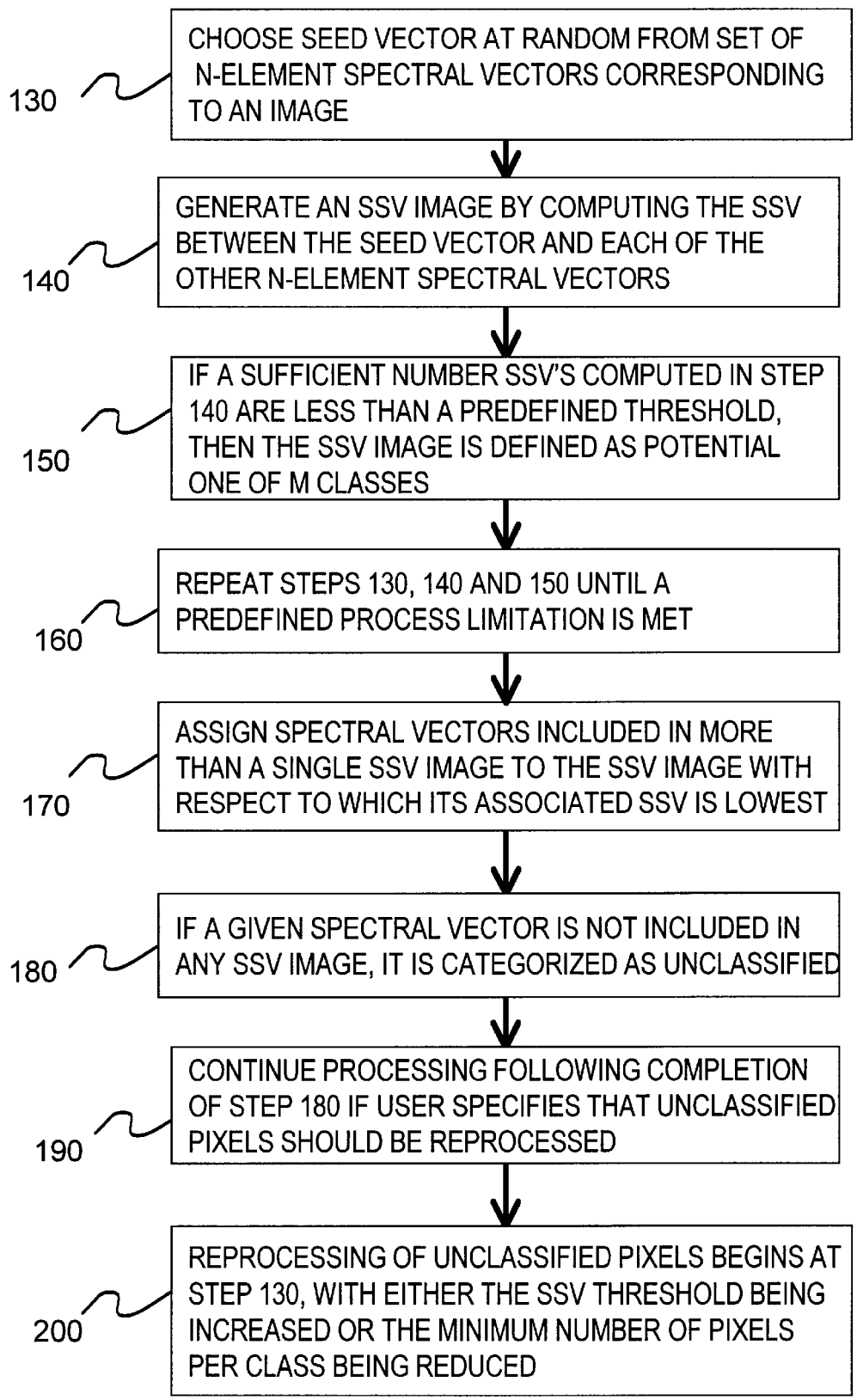
FIG. 4B is a flow chart representative of the processing performed in accordance with an unsupervised classification algorithm consistent with one aspect of the present invention.

FIG. 4B is a flow chart representative of the processing performed in accordance with an unsupervised classification algorithm consistent with one aspect of the present invention. Once a set of N-element spectral vectors corresponding to an image has been collected as described above, a "seed" vector is chosen at random from this set (step 130). The seed vector is then used to generate an "SSV image" by computing the SSV between the seed vector and each of the other N-element spectral vectors (step 140). If a sufficient number of these computed SSVs are less than a predefined threshold, the SSV image is defined a potential one of the M classes and retained (step 150). Those spectral vectors associated with SSVs within the threshold are defined as "processed", while the spectral vectors associated with SSVs greater than the threshold remain "unprocessed". Steps 130, 140 and 150 are repeated until a predefined process limitation is met. For example, these steps could be repeated until "M" potential classes have been created or less than a specified number of pixels remain unprocessed (step 160). If a given spectral vector is included in more than a single SSV image, it is assigned to the SSV image (i.e., potential class) with respect to which its associated SSV is lowest (step 170). If a given spectral vector is not included in any SSV image, it is categorized as unclassified (step 180). Following completion of step 180, processing continues only if the user has specified that unclassified pixels should be "reprocessed" (step 190). Prior to initiating such reprocessing, either the SSV threshold is increased or the minimum number of pixels per class reduced. The classification algorithm then resumes processing at step 130 as described above, with the exception that any spectral vectors classified during prior iterations are not reclassified during reprocessing (step 200).

Figure 5A:
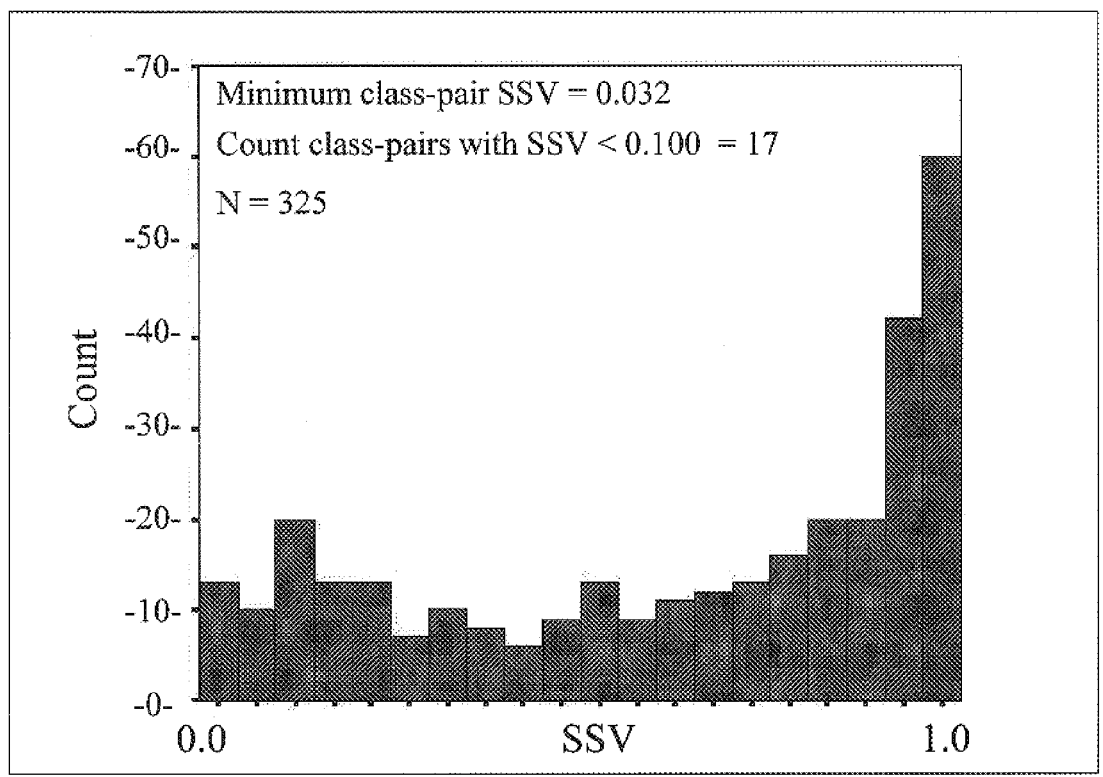
FIGS. 5A and 5B are histograms of the Spectral Similarity Values representative of a pair of images of the same terrain taken on different occasions.
Figure 5B:
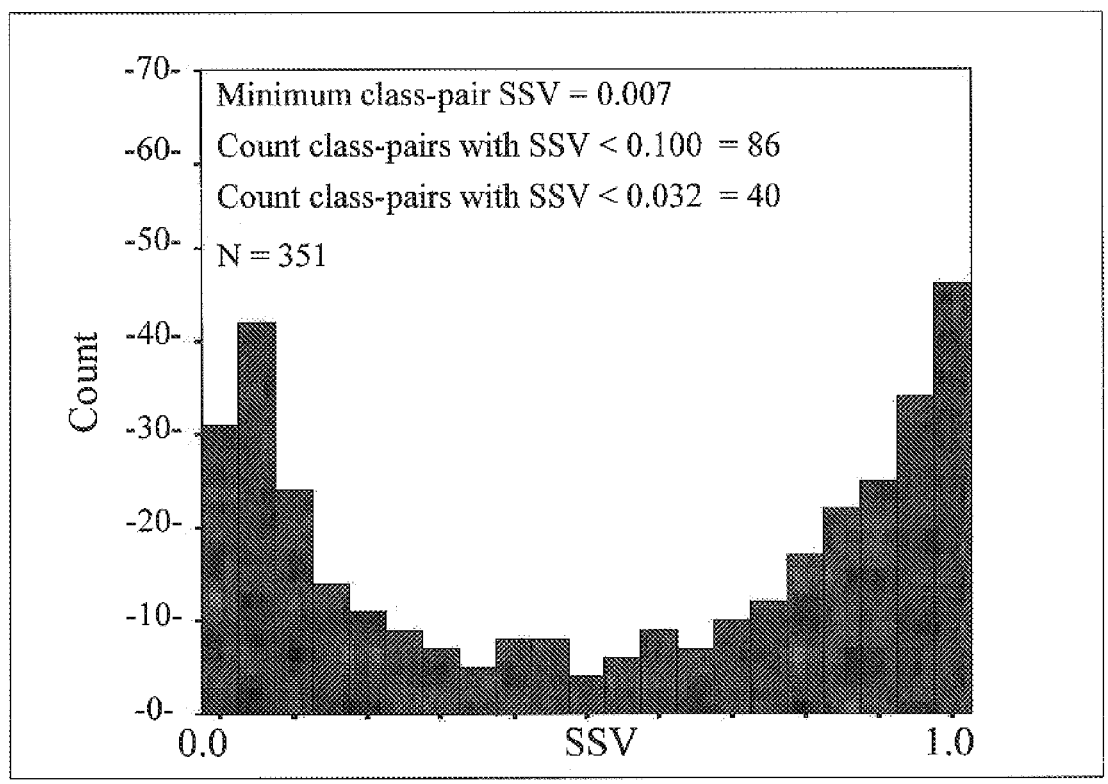

FIGS. 5A and 5B are exemplary histograms of the SSVs representative of a pair of images of the same terrain taken on different occasions. In the cases of FIGS. 5A and 5B, the unsupervised classifications conducted pursuant to step 60 above produced sets of 26 and 27 classes, respectively. This yields a set of 325 SSVs for the 325 class-pair combinations in the case of FIG. 5A, and a set of 351 SSVs in the case of FIG. 5B. The minimum SSV in the case of FIG. 5A was determined to be 0.032, and the minimum SSV in the case of FIG. 5B was found to be 0.007. As may be appreciated by reference to FIGS. 5A and 5B, there exist fewer "very similar" SSVs in FIG. 5A than in FIG. 5B. Specifically, FIG. 5A includes 17 SSVs below 0.10, while FIG. 5B includes 86 SSVs below 0.10. In addition, it is observed that 40 SSVs in FIG. 5B are smaller than minimum SSV represented in FIG. 5A (i.e., 0.032). All of the foregoing indicates that the image corresponding to the histogram of FIG. 5A is of higher quality than the image corresponding to FIG. 5B.

Image Quality Required by Spectral Task

In another aspect, the present invention contemplates determining the minimum SSV required to ensure that specific spectra indicative of differing characteristics within a subject image may be separately discerned. As an example, consider the case in which it is desired to detect when certain agricultural areas have become stressed or diseased though analysis of images of such areas. Spectra representing healthy and diseased or otherwise stressed crop could be collected using conventional means (e.g., from imagery or field data), and the SSV between the spectra representing the healthy and stressed crop would then be computed. This computed SSV would define the minimum SSV characterizing images potentially useful in discriminating between healthy and diseased crop. That is, subsequently collected images having SSVs less than this minimum SSV would be helpful in identifying such diseased areas, while subsequently collected images having SSVs exceeding this minimum SSV would not generally be helpful.

FIG. 6 provides a tabular listing of an exemplary set of minimum SSVs required to discriminate between portions of the field of corn represented by FIGS. 5A and 5B provided with differing amounts of a nitrogen fertilizer application. In the example of FIG. 6, a spectroradiometer was used on a series of dates to measure the spectra from plots of the corn field subjected to five different levels of the nitrogen application. Minimum SSVs were computed based upon the measurement results in accordance with Equations (1) through (6). These minimum SSVs comprise the entries in the listing of FIG. 6, and each represents the similarity between spectra collected from various plots. For example, on May 24, 1998 an SSV of 0.013 was found to exist between the spectra representative of a plot subjected to 120 of nitrogen per acre (120 lbs.N/acre) and the spectra representative of a plot treated with 40 lbs.N/acre. Accordingly, on that day an image would be required to be characterized by an SSV of less than approximately 0.013 in order to enable regions treated with 40 lbs.N/acre to be discriminated from those receiving 120 lbs.N/acre.

Figure 7A:
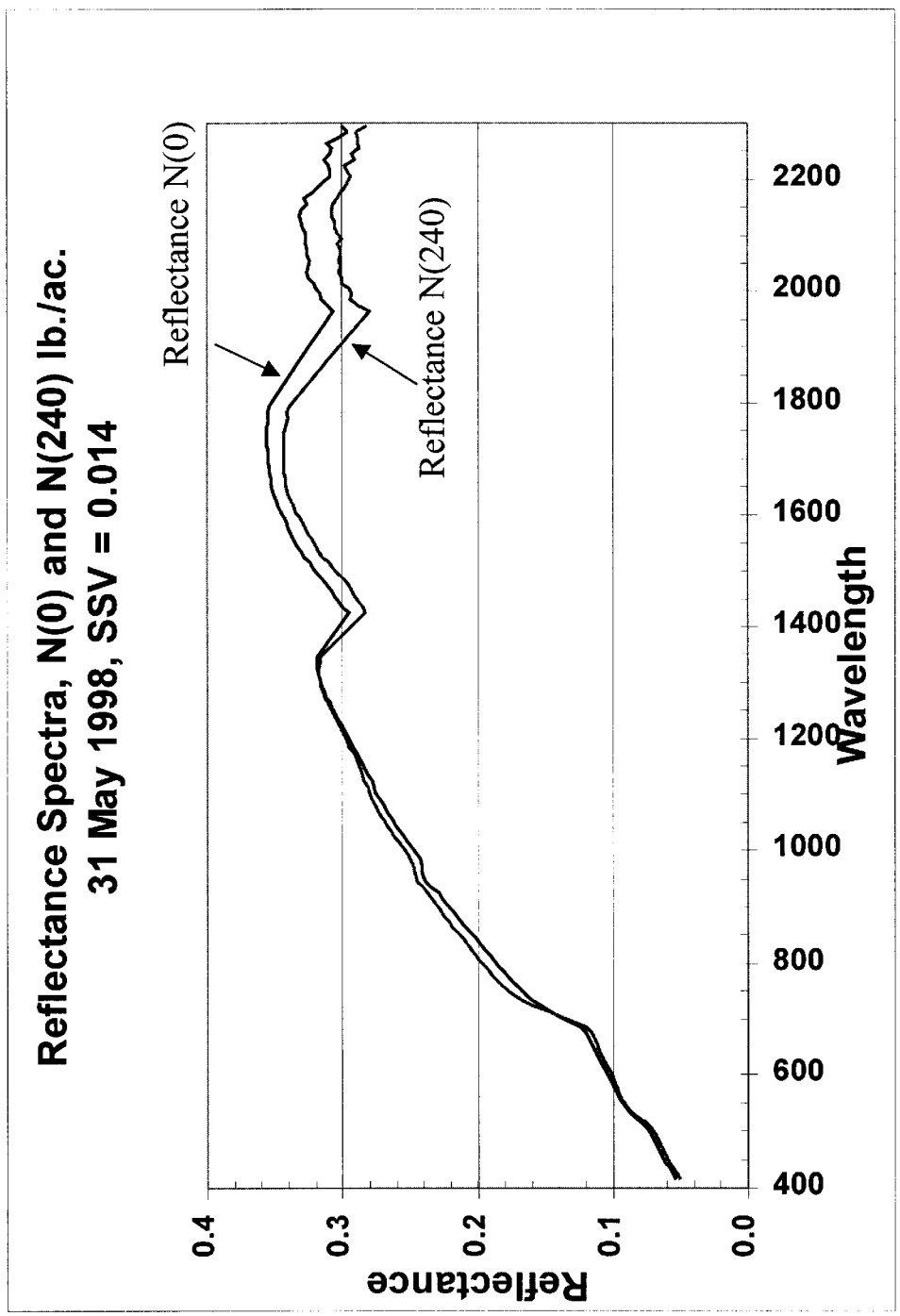
FIGS. 7A and 7B illustrate the pairs of reflectance spectra used to compute the minimum Spectral Similarity Values for certain of the entries in the tabular listing of FIG. 6.
Figure 7B:
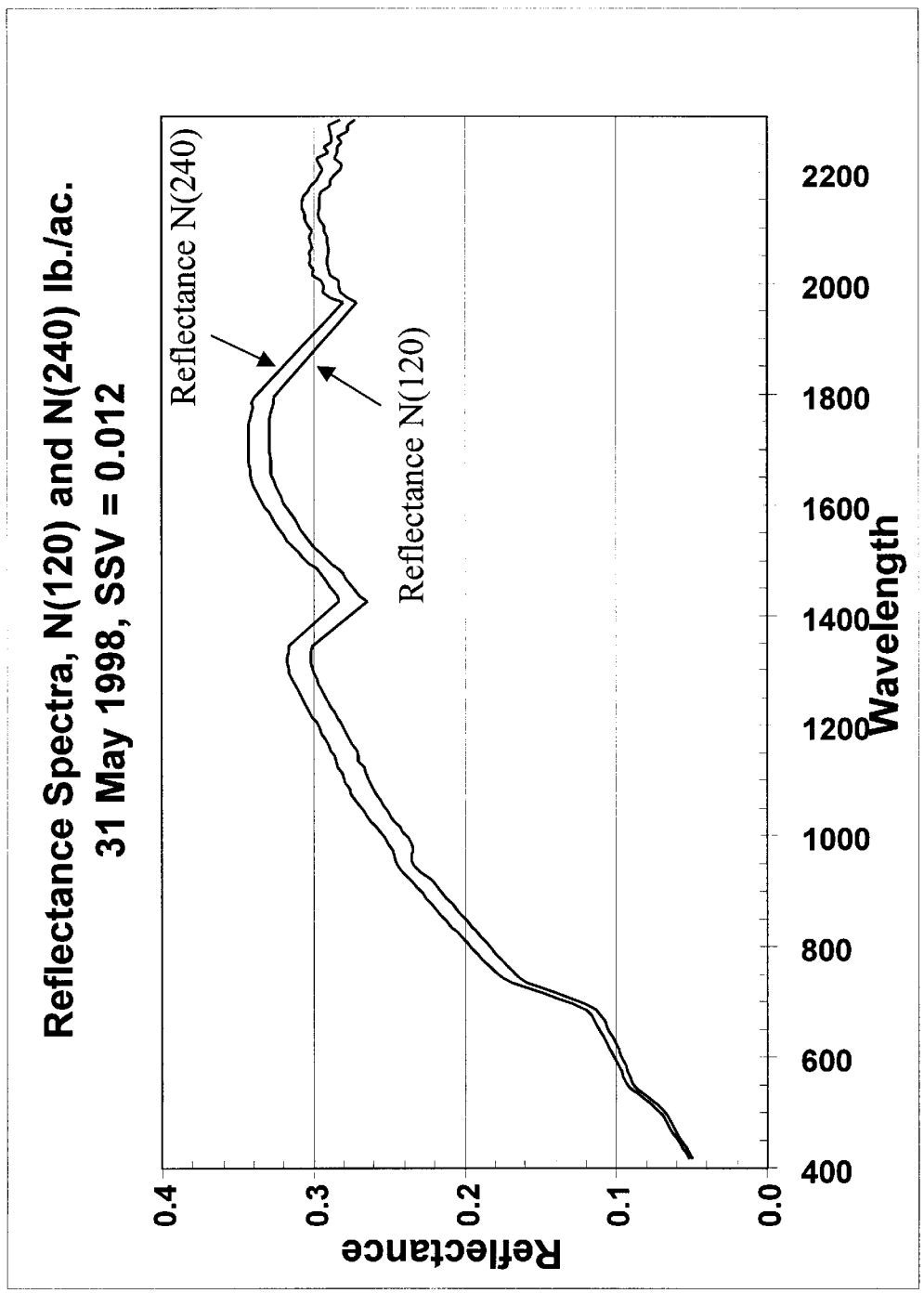
Figure 8A:
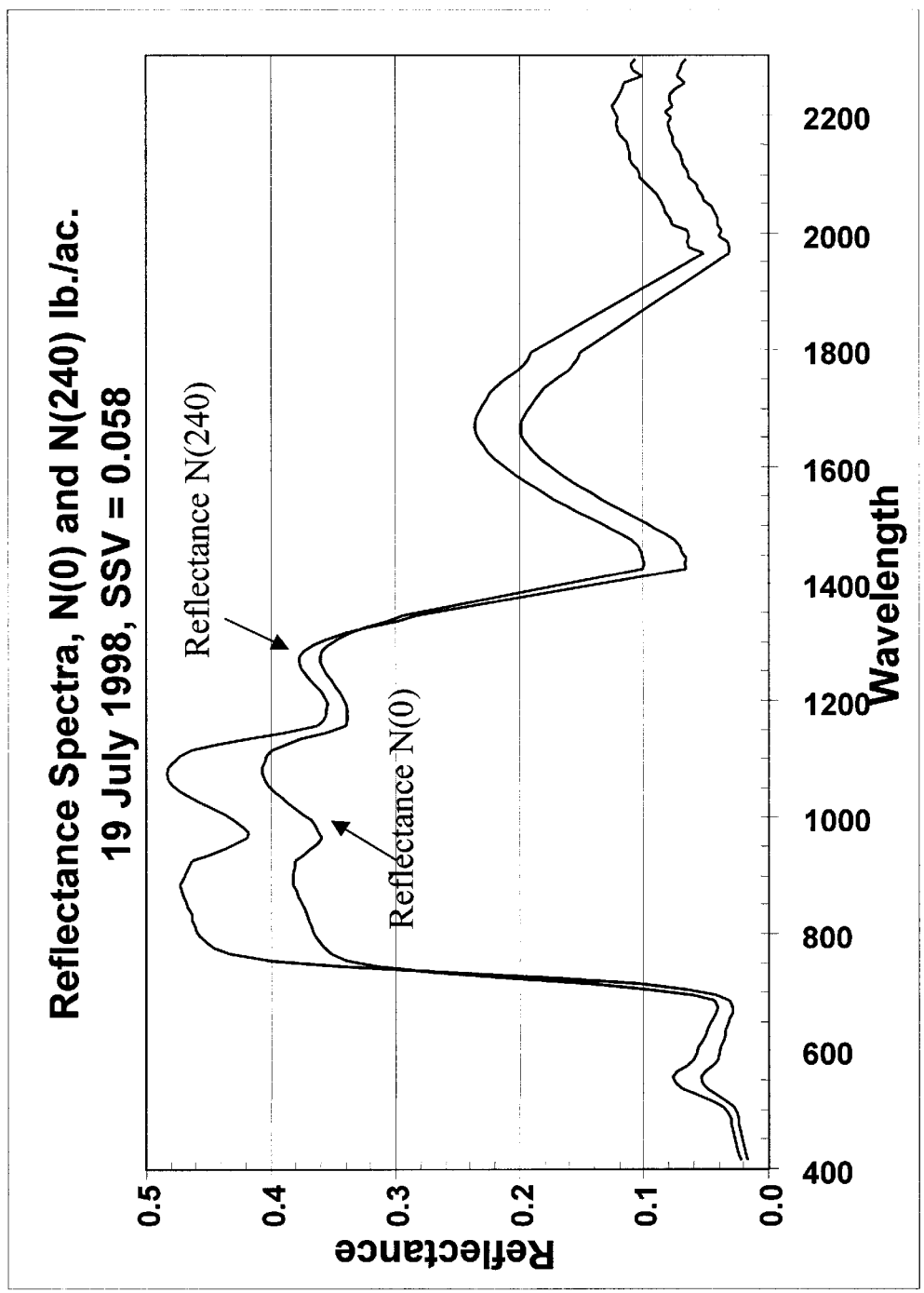
FIGS. 8A and 8B represent additional spectra collected from the plot areas represented by the tabular listing of FIG. 6.
Figure 8B:
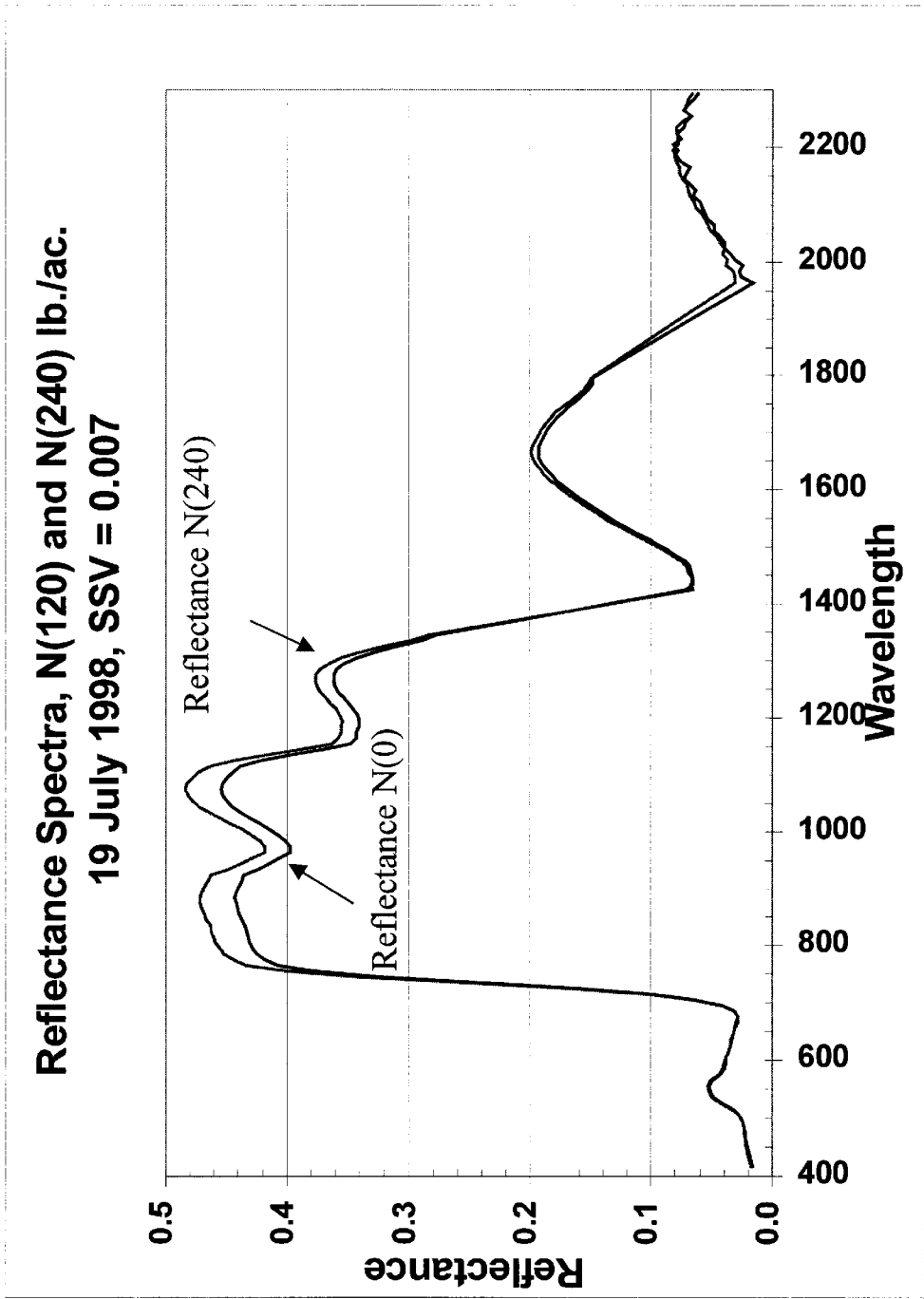

FIGS.: 7A and 7B illustrate the pairs of reflectance spectra used to compute the minimum SSVs for certain of the entries in the tabular listing of FIG. 6. Specifically, FIG. 7A depicts the pair of reflectance spectra collected on May 31, 1998 used to determine the minimum SSV (i.e., 0.014) required to distinguish between plots provided with 0 lbs.N/acre from those provided with 240 lbs.N/acre. Similarly, FIG. 7B depicts the pair of reflectance spectra used to determine the minimum SSV (i.e., 0.012) necessary for distinguishing between plots receiving 120 and 240 lbs.N/acre. FIGS. 8A and 8B represent spectra collected from the same plots on Jul. 19, 1998; that is, several weeks after the spectra depicted in FIGS. 7A and 7B were collected. As is indicated by FIG. 8A, in this instance a minimum SSV of 0.058 was found to be necessary to discern between plots of the corn field respectively receiving lbs.N/acre and 240 lbs.N/acre. Similarly, a minimum SSV of 0.007 was found to be necessary to distinguish between plots receiving 120 and 240 lbs.N/acre.

Figure 9:
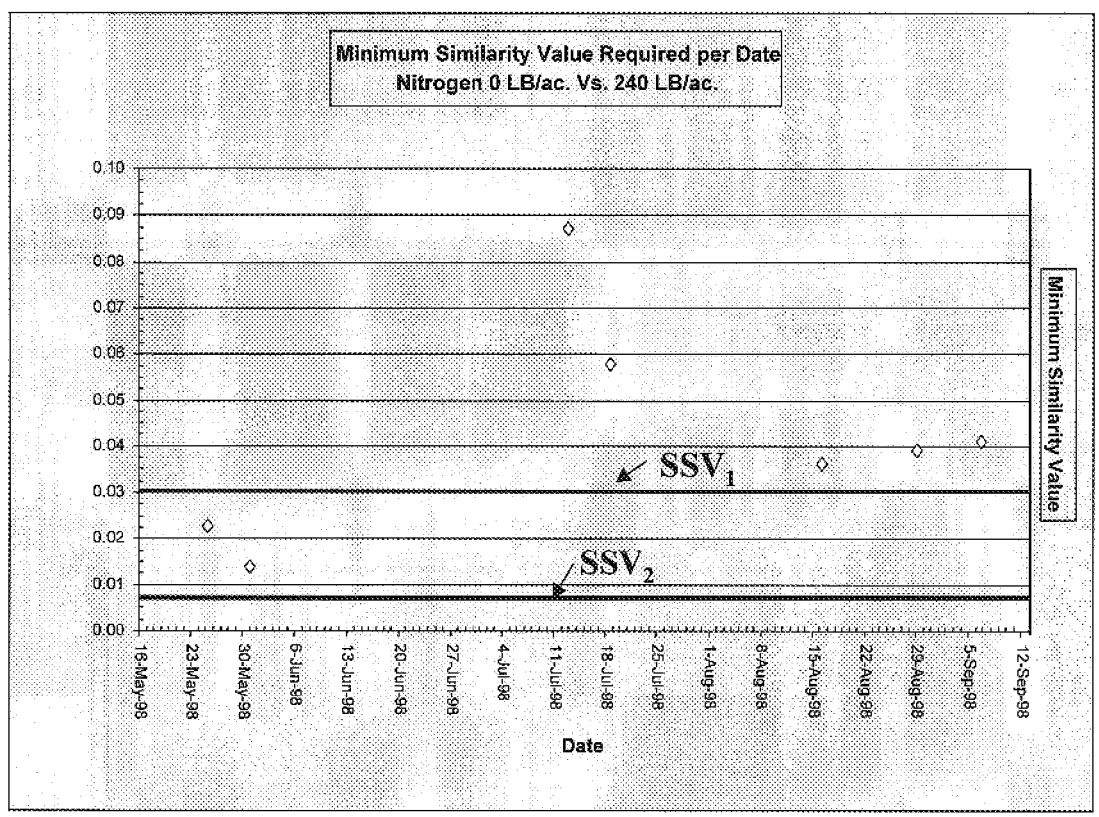
FIG. 9 graphically represents the time variation of the minimum SSVs associated with those of the plots represented by FIG. 6 which were subjected to 0 lbs/acre and 240 lbs/acre of a nitrogen fertilizer application.
Figure 10:
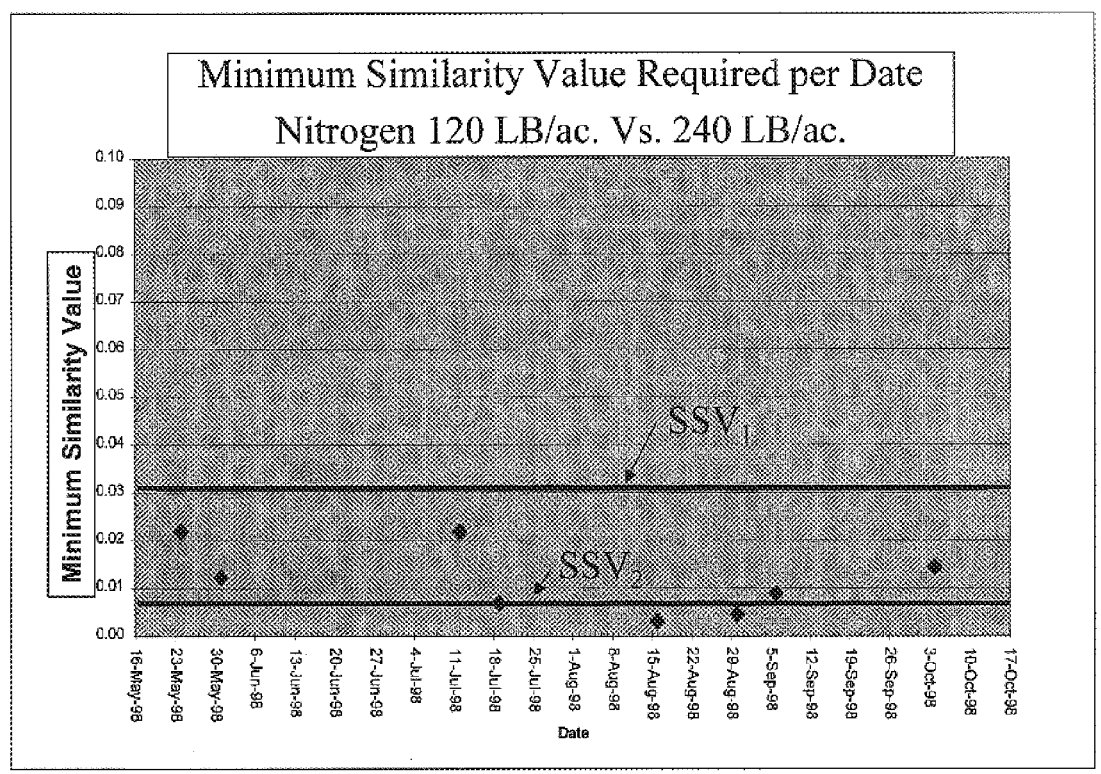
FIG. 10 graphically represents the time variation of the minimum SSVs associated with those of the plots represented by FIG. 6 which were subjected to 120 lbs/acre and 240 lbs/acre of the nitrogen fertilizer application.

FIG. 9 graphically represents the time variation of the minimum SSVs associated with those of the plots of FIG. 6 subjected to 0 lbs.N/acre and 240 lbs.N/acre. Similarly, FIG. 10 graphically represents the time variation of the minimum SSVs associated with those of the plots of FIG. 6 subjected to 120 lbs.N/acre and 240 lbs.N/acre. In order to provide context and a basis for comparison, the minimum SSV associated with the image corresponding to FIG. 5A is shown as "$SSV_1$," and the minimum SSV associated with the image corresponding to FIG. 5B is shown as "$SSV_2$". As is indicated by FIG. 9, the preponderance of minimum SSVs above both $SSV_1$ and $SSV_2$ indicates that either the image corresponding to FIG. 5A or to FIG. 5B could be utilized to discriminate plot regions subjected to 0 lbs.N/acre from plot regions subjected to 240 lbs.N/acre. In contrast and as is represented by FIG. 10, the presence of all minimum SSVs below $SSV_1$ indicates that the image corresponding to FIG. 5A would not be of use in distinguishing plots receiving 120 lbs.N/acre from those receiving 240 lbs.N/acre. Only the image corresponding to FIG. 5B would be potentially useful in so distinguishing between these plots, since $SSV_2$ is seen to be less than five of the eight computed SSVs.

Although the above application has been described primarily in the context of particular embodiments and applications, one skilled in the art can readily appreciate that the teachings of the present invention may be applied to other embodiments and applications. Thus, the application is meant only to be limited by the scope of the appended claims.

What is claimed is:

1. A method for evaluating quality of an image, comprising:
    receiving a spectral image;
    extracting a plurality of pixels from the spectral image;
    converting the plurality of pixels into a plurality of spectral vectors, each element in each spectral vector representing a property of a respective one of a number (N) of spectral bands;
    categorizing said plurality of spectral vectors into a set of M classes;
    computing a mean vector for each of said M classes based upon the spectral vectors associated therewith;
    computing spectral similarity values between pairs of said mean vectors; and
    analyzing said spectral similarity values in order to obtain information relevant to said quality of said image.

2. The method of claim 1 wherein said categorizing includes computing spectral similarity values between a seed one of said plurality of spectral vectors and each of a set of unprocessed ones of said plurality of spectral vectors.

3. The method of claim 1 wherein said computing spectral similarity values includes computing a magnitude difference between a first and a second of said mean spectral vectors.

4. The method of claim 3 wherein said computing spectral similarity values includes computing a shape difference between said first and said second mean spectral vectors.

5. The method of claim 3 wherein said property corresponds to reflectance, and wherein said determining a magnitude difference includes:
    computing a squared differential reflectance magnitude between said first mean spectral vector and said second mean spectral vector with respect to a number (N) of said spectral bands;
    summing said squared differential reflectance magnitudes; and
    dividing the sum of said squared differential reflectance magnitudes by N.

6. The method of claim 5 wherein said determining a magnitude difference includes evaluating the following expression over a number (Nb) of said spectral bands:

$$d_e = \sqrt{\frac{1}{Nb}\sum_{i=1}^{Nb}(x_i - y_i)^2}$$

wherein $d_e$ represents said magnitude difference, $x_i$ represents the value of the first mean spectral vector in the $i^{th}$ of said spectral bands, and wherein $y_i$ represents the value of the second mean spectral vector in the $i^{th}$ of said spectral bands.

7. The method of claim 4 wherein said determining a shape difference includes evaluating the following expression over a number (Nb) of said spectral bands:

$$r^2 = \left(\frac{\frac{1}{Nb-1}\sum_{i=1}^{Nb}(x_i - \mu_x)(y_i - \mu_y)}{\sigma_x \sigma_y}\right)^2$$

wherein $r^2$ is representative of said shape difference, $x_i$ represents the value of the first mean spectral vector in the $i^{th}$ of said spectral bands, $y_i$ represents the value of the second mean spectral vector in the $i^{th}$ of said spectral bands, $\mu_x$ represents the mean value of the first spectral vector vector, and $\mu_y$ represents the means value of the second mean spectral vector, and wherein $\sigma_x$ represents the standard deviation of first mean spectral vector and wherein $\sigma_y$ represents the standard deviation of the second mean spectral vector.

8. A method for evaluating quality of an image, comprising:
    receiving a spectral image;
    organizing pixels from the spectral image into a plurality of classes by categorizing spectral vectors characterizing said pixels;
    determining a mean spectral vector for each of said plurality of classes, each said mean spectral vector being determined using ones of said spectral vectors associated with one of said plurality of classes;
    computing spectral similarities between pairs of said mean spectral vectors; and
    analyzing said spectral similarities in order to obtain information relevant to said quality of said image.

9. The method of claim 8 wherein said organizing includes computing spectral similarity values between a seed one of said pixels and each of a set of unprocessed ones of said pixels.

10. The method of claim 8 wherein said computing includes determining magnitude differences and shape differences between said pairs of said mean spectral vectors.

11. An image processing system comprising:
   an input interface through which is received a spectral image;
   a computer readable medium having stored therein an image quality assessment stored program; and
   a processor operative to execute said image quality assessment stored program and thereby:
      (i) organize pixels from the spectral image into a plurality of classes by categorizing spectral vectors characterizing said pixels,
      (ii) determine a mean spectral vector for each of said plurality of classes, each said mean spectral vector being determined using ones of said spectral vectors associated with one of said plurality of classes,
      (iii) compute spectral similarities between pairs of said mean spectral vectors, and
      (iv) analyze said spectral similarities in order to obtain information relevant to quality of said image.

12. The system of claim 11 wherein said processor is further operative to compute spectral similarity values between a seed one of said pixels and each of a set of unprocessed ones of said pixels in order to facilitate organization of said pixels into said plurality of classes.

13. The system of claim 11 wherein said processor is further operative to compute said spectral similarities based upon magnitude differences and shape differences between said pairs of said mean spectral vectors.

14. An article of manufacture for use with a data processing system, comprising a computer readable medium having stored therein an image quality assessment stored program, said data processing system being configured by said image quality assessment stored program when executed by said data processing system to:
   organize pixels from a spectral image into a plurality of classes by categorizing spectral vectors characterizing said pixels;
   determine a mean spectral vector for each of said plurality of classes, each said mean spectral vector being determined using ones of said spectral vectors associated with one of said plurality of classes;
   compute spectral similarities between pairs of said mean spectral vectors; and
   analyze said spectral similarities in order to obtain information relevant to quality of said spectral image.

15. The article of manufacture of claim 14 wherein said image quality assessment stored program, when executed by said data processing system, is further operative to compute said spectral similarities based upon magnitude differences and shape differences between said pairs of said mean spectral vectors.

16. An image processing system comprising:
   an input interface through which is received a spectral image;
   a computer readable medium having stored therein an image quality assessment stored program; and
   a processor operative to execute said image quality assessment stored program and thereby:
      (i) extract a plurality of input pixels from the spectral image,
      (ii) converting the plurality of input pixels into a plurality of spectral vectors, each element in each of said spectral vectors representing a reflectance of a respective one of a plurality of spectral bands,
      (iii) organize said plurality of spectral vectors into a set of M classes;
      (iv) determine a mean reflectance vector associated with each of said M classes,
      (v) compute spectral similarities between pairs of said mean reflectance vectors, and
      (vi) analyze said spectral similarities in order to obtain information relevant to quality of said spectral image.

17. The image processing system of claim 16 wherein said processor is further operative to compute spectral similarity between a first of said mean spectral vectors and a second of said mean spectral vectors based on a magnitude difference and a shape difference therebetween.

18. The image processing system of claim 17 wherein said processor is further operative to determining said magnitude difference by:
   computing a squared differential reflectance magnitude between said first mean spectral vector and said second mean spectral vector with respect to a number (N) of said spectral bands;
   summing said squared differential reflectance magnitudes; and
   dividing the sum of said squared differential reflectance magnitudes by N.

19. The image processing system of claim 16 wherein said processor is further operative to compute spectral similarity values between a seed one of said spectral vectors and each of a set of unprocessed ones of said spectral vectors in order to facilitate organization of said spectral vectors into said M classes.

* * * * *